Aug. 26, 1941.　　　　P. GENESY　　　　2,253,697
DIE FOR MOLDING OR CASTING OPTICAL LENSES
Filed July 11, 1938
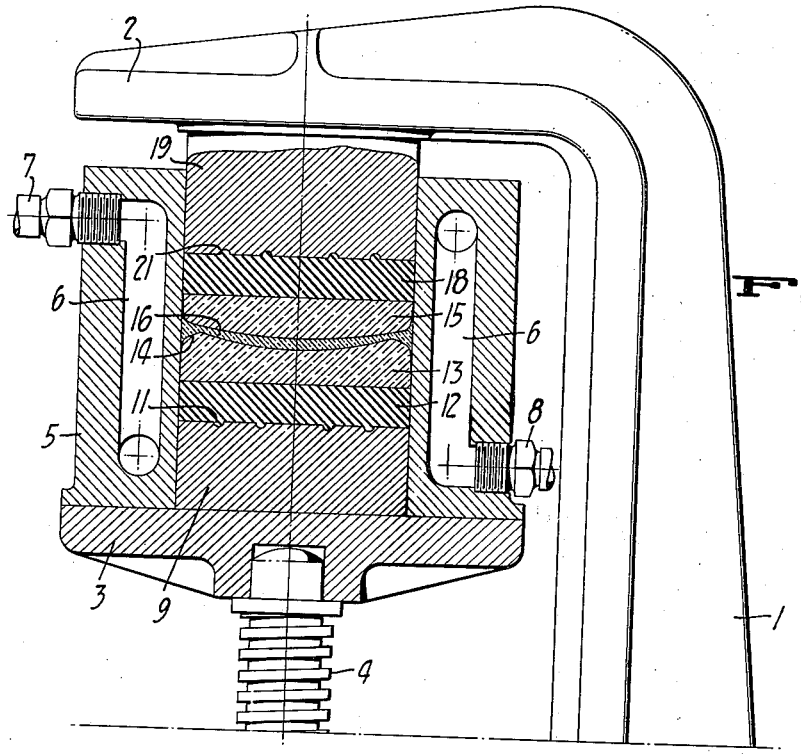
FIG_1_
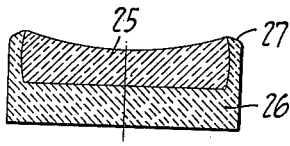
FIG_2_
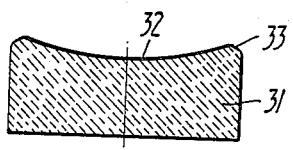
FIG_3_
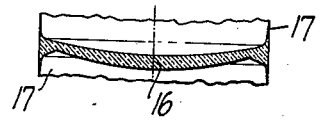
FIG_4_
INVENTOR.
Paul Genesy
BY
ATTORNEY Patented Aug. 26, 1941

2,253,697

UNITED STATES PATENT OFFICE 2,253,697

DIE FOR MOLDING OR CASTING OPTICAL LENSES

Paul Genesy, Berkeley, Calif., assignor of one-third to Jenkel-Davidson Optical Company, a partnership composed of Forrest B. Davidson and Walter C. Jenkel, all of San Francisco, Calif.

Application July 11, 1938, Serial No. 218,501

6 Claims. (Cl. 18—47)

This invention relates to dies for molding or casting optical lenses from thermo-plastic materials such as "Lucite" manufactured and sold by E. I. du Pont de Nemours & Company.

The acceptability of an optical lens made from a thermo-plastic material of this kind depends upon the use of a die or mold on which a substantially perfect optical surface can be formed. Dies for this purpose have been made of metal and glass, and although acceptable lenses have been produced from dies made of these materials, considerable difficulty has been experienced. For some reason or other a true optical surface can not be ground on iron or steel and as a result it has been found necessary in preparing a metal die first to grind the desired curve into the metal, chrome-plate the surface so prepared, regrind the plated surface, replate, and then regrind. Furthermore, in casting lenses from the thermo-plastic material in powdered form, higher temperatures are required than when molding lenses from a sheet or blank of thermo-plastic material. The additional temperature required makes the use of a metal die unsuitable, for the relatively high coefficient of expansion of the metal is responsible for the presence of heat marks and other flaws in the final product.

The obstacles encountered in the use of glass dies may be better appreciated from a brief consideration of the process and equipment used in molding or casting lenses. The thermo-plastic material, either in sheet or powder form, is placed between two dies enclosed in a cylinder, the thermo-plastic material, dies, and cylinder are brought up to the required temperature and then the dies are pressed together. Although the clearances between the dies and the cylinder are close, some of the plastic material is forced between these members. The inner peripheral edges of the dies are thereby placed under considerable pressure, sufficient in many instances to break one or both of them.

Case-hardened glass dies are unsatisfactory from a commercial standpoint for the reason that if, in grinding, the case-hardened outer film is penetrated, the die will "explode."

One of the objects of this invention is the provision of a glass or glazed porcelain die, the inner peripheral edge of which is beveled so as to eliminate abrupt edges.

Another object of the invention is the provision of a glass or porcelain die fused and encased within a reinforcing band or cup of material having substantially the same coefficient of expansion as the die proper but having a greater resistance to mechanical shocks and to sudden cooling and heating.

Still another object of the invention is the provision of a die made in whole or in part of the mineral sillimanite.

The invention possesses other advantageous features, some of which with the foregoing will be set forth at length in the following description where that form of the invention which has been selected for illustration in the drawing accompanying and forming a part of the present specification is outlined in full. In said drawing, one form of the invention is shown, but it is to be understood that it is not limited to such form, since the invention as set forth in the claims may be embodied in a plurality of forms.

Referring to the drawing:

Figure 1 is a vertical mid-section of a press and dies embodying the objects of my invention.

Figure 2 is a vertical section taken through a die fused within a reinforcing cup.

Figure 3 is a vertical section taken through a glazed porcelain die.

Figure 4 is a vertical section taken through an optical lens produced by the dies and press shown in Figure 1.

In Figure 1 is shown a press 1, comprising a stationary plate 2 and a platform or table 3 operated by a screw 4. Seated on the table is a cylinder 5 provided with passageways 6 and fittings 7 and 8 for the circulation of steam and cold water. Seated on the table 3 within the cylinder 5 is a metal disc 9 provided with indentations 11 into which is pressed a "Bakelite" facing 12. Resting on the facing 12 is a concave glass die 13 having a close clearance with the walls of the cylinder 5. It is to be particularly noted that the inner peripheral edge of the die 13 is beveled as at 14 in order to eliminate the sharp or abrupt edge which would otherwise obtain. Preferably the bevel 14 should be slightly rounded. Pressed between the die 13 and a complementary convex die 15 is a pressed thermo-plastic optical lens 16 which as best shown in Figure 4 has been formed with ragged marginal edges 17 due to the slight clearance between the dies 13 and 15 and the cylinder 5. The outer face of the die 15 is engaged by the "Bakelite" facing 18 secured to the metal disc 19 by the indentations 21.

To operate the device above described, the table 3 is lowered by the screw 4 sufficiently to permit the cylinder 5 to be removed and the die assembly to be removed from the cylinder, it being understood that the fittings 7 and 8 are connected with a suitable source of steam and cold water by flexible connections so that the cylinder is capable of limited movement. This having been done, a blank of thermo-plastic material or a predetermined quantity of the material in powdered form, is placed between the dies 13 and 15. The dies and metal discs 9 and 19 are then assembled in the cylinder as shown in Figure 1, the entire assembly brought up to temperature, and then pressure applied by the screw 4. This having been done, cold water is circulated through the cylinder to solidify and mold the plastic material in strict conformity with the dies 13 and 15.

In Figure 2 a die is shown formed by a disc of glass 25 fused within a cup 26 of sillimanite ware. Sillimanite ware has been found to be far more resistant to mechanical shock and temperature changes than glass, and being obtainable with substantially the same coefficient of expansion as glass, forms an excellent reinforcement for the glass and protects the glass from the stresses and strains to which it is subjected during the molding or casting operation. As an added precaution, the inner peripheral edge of the die so formed may be beveled as at 27.

In Figure 3, a concave die 31 of sillimanite ware is shown provided with a glazed optical surface or layer of glass 32 having a beveled inner peripheral edge 33. The word "inner" as used throughout this application and the appended claims refers to that end of the die on which the optical surface is formed.

Figure 4 merely shows that in spite of the close clearances between the dies and the cylinder, a thin film of plastic material is forced between these members and is responsible for subjecting the dies to various stresses and strains.

By beveling the inner peripheral edge of the dies, abrupt edges are avoided which if present are subject to breakage. Not only would the edges break, but the entire die would be subject to breakage.

By reinforcing the die in a band or cup of a porcelain or refractory material such as sillimanite ware, breakage from the stresses and strains to which the die is subjected is likewise prevented.

Sillimanite ware is a refractory material made from sillimanite ore ($Al_2O_3 \cdot SiO_2$), clay and a proper flux and is obtainable from the Central Scientific Company of Chicago.

I claim:

1. A die of refractory material for molding or casting lenses characterized in that it is reinforced by a band or sillimanite.

2. A die of refractory material for molding or casting lenses characterized in that it is fused within and reinforced by a cup of sillimanite.

3. A concave glass die for molding or casting lenses characterized in that it is fused within and reinforced by a cup of sillimanite.

4. A die for casting or molding optical lenses comprising: a sillimanite base; and a layer of glass fused to one side of said base, said layer of glass being formed with an optical surface.

5. A concave glass die for molding or casting lenses characterized in that it is fused within and reinforced by a cup of ceramic material containing a substantial quantity of sillimanite.

6. A concave glass die for molding or casting lenses characterized in that it is fused to a base of ceramic material and is formed with an optical surface.

PAUL GENESY.